United States Patent Office 3,326,586
Patented June 20, 1967

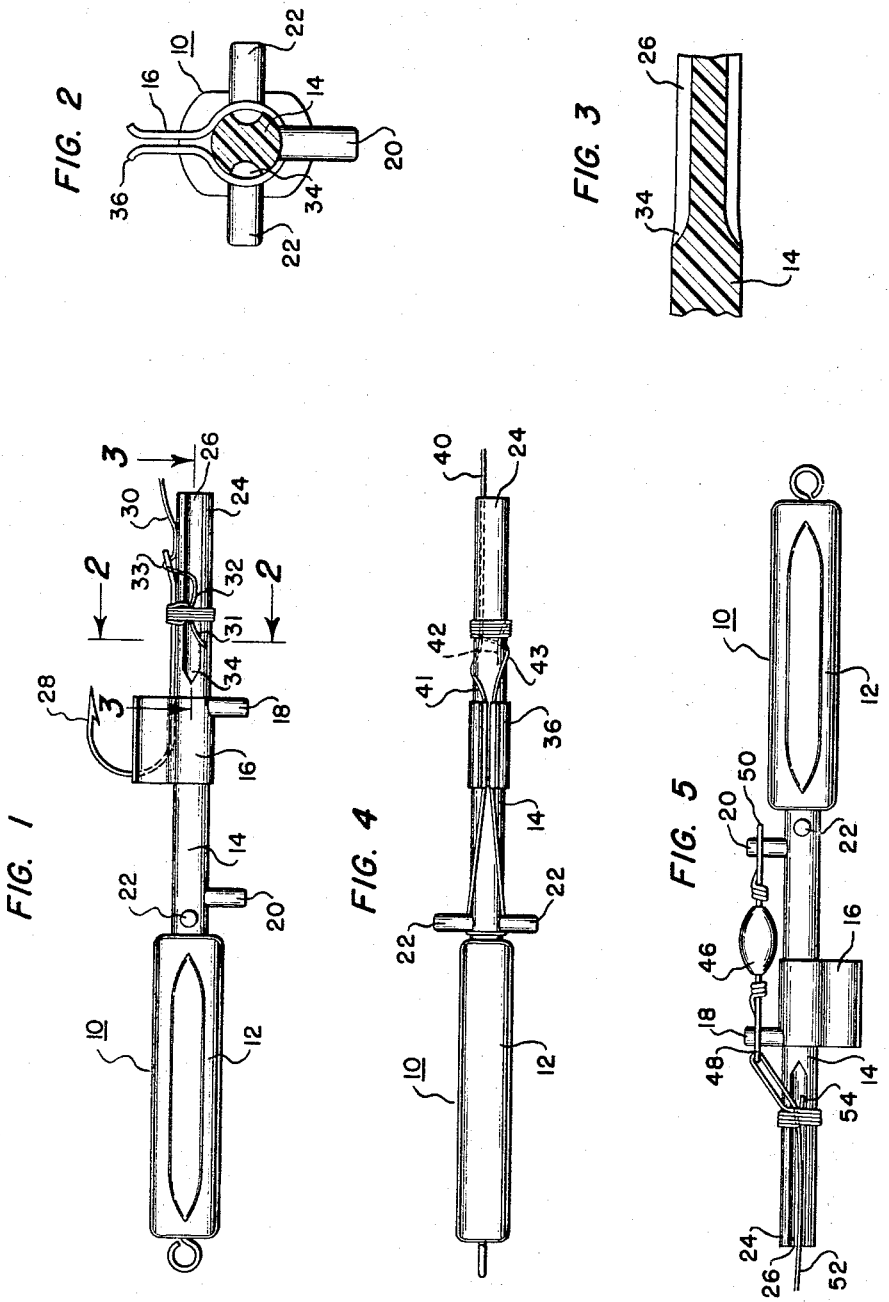
INVENTORS
ROBERT M. FROST
CHARLES R. JONES

3,326,586
SNELL KNOT TYING TOOL
Robert M. Frost, 3610 Dupont St., San Diego, Calif.
92106, and Charles R. Jones, 153 Cary Lane, Pomona,
Calif. 91767
Filed July 9, 1965, Ser. No. 470,743
11 Claims. (Cl. 289—17)

ABSTRACT OF THE DISCLOSURE

This invention relates to a small, hand-held tool for tying snell knots in securing fishing line to fish hooks, swivels, sinkers and the like. The tool comprises means for holding the fish hook or the like against an elongated, projecting portion in a manner that allows line to be wrapped around the elongated member and the shank of the fish hook simultaneously. The hook and the wrapped line are then slidably removed from the member and the line is tightened into a snell knot.

---

The tying of fishing line or leader by a snell knot to fish hooks, swivels, connectors or the like is a difficult task that requires considerable dexterity and skill to form a tight, satisfactory knot. This is especially true where the snell knot is tied at the place of use, such as on a rocking fishing boat or at a fishing site and where stiff and springy leader, such as monofilament, is used. Further even where the line is not stiff and the environment is good some kind of a tool is usually required to quickly form a good snell knot.

There are several known tools that may be used to ease the task of tying snell knots. Such tools vary from the quite complicated to the relatively simple. However, the tools as a whole, show that it would be most advantageous to have a snell knot tying tool that is simple and easy to construct, noncorrosive, rugged in construction with nonmoving parts, and has ease and flexibility of use even under the adverse environmental conditions that normally exist at fishing sites.

Therefore it is an object of this invention to provide an improved and novel combination snell knot tying tool.

It is another object of this invention to provide an improved and novel snell knot tying tool that is capable of tying snell knots in several kinds of fishing line attachments.

It is another object of this invention to provide an improved and novel snell knot tying tool that is rugged in construction, light in weight and inexpensive to make.

The snell knot tying tool of this invention comprises a handle having an elongated, projecting portion. The projecting portion has longitudinal grooves on either side thereof. These grooves extend from the projecting end to a point midway of the projecting portion, at which point the grooves gradually taper outward to conform with the outer circular circumference of the remainder of the projecting portion. The tool has means for gripping or holding a fish hook by its prong or curved portion so that the fish hook shank is aligned with and along the upper side of the extension. The fish hook is thus fixedly secured to the tool with the prong portion being prevented from rotating around its shank. The tool also has a pair of knobs or the like that project outwardly in a direction normal to the axis of the extension. A loop of fishing line is then looped over the knobs allowing tension to be drawn on the pair of lines aiding in the tying of a snell knot in the line forming a loop. The means for gripping the fish hook also functions in the latter use to converge the lines to the locale where the knot is tied and will also grip the line sufficiently to hold the aforesaid tension if desired. Still further the tool has a pair of knobs spaced along the longitudinal length of the longitudinal projection for supporting swivels, weights or the like while a line is attached thereto by a snell knot.

In tying the snell knot, the end of a length of leader or line is passed through the eye of the fish hook, swivel, weight or the like or around the aforesaid knobs and then wrapped several times around either the extension or the jointly positioned extension and fish hook shank. Each convolution of the line is laid against the preceding one in a direction toward the eye of the fish hook or away from the handle of the tool. When sufficient loops of line have been wrapped around the fish hook shank and extension, the end of the line is then thrust along the groove portion between the convolutions and the side of the extension in a direction toward the handle portion. This passes the end of the line between the fish hook shank and extension and wrapped line. The line and a fish hook is then pulled from the extension with the fish hook and line being slid off the projected end of the extension. The loose ends of the line and the end of the line extending through the eye of the hook are then pulled in opposite directions thereby tightening the convolution into a tightly clinching snell knot.

Important features of this invention are that the tool restrains the fish hook, swivel, weight or the like from movement relative to the tool and prevents their rotational movement. Further the tool holds the line in a substantially taut condition. Thus snell knots may be tied using stiff and springy leader, without having to tightly hold the fish hook by hand against movement of the prong, which movement, if it occurs, may cause injury to the user. Our invention also allows the user to quickly tie snell knots under conditions considered adverse or inconvenient when using other known tools.

Other objects and many attended advantages of this invention will be readily apparent as the same becomes better understood by reference to the following description, when considered in connection with the accompanying drawings, in which like reference numerals designate like parts throughout the figures thereof and wherein:

FIGURE 1 is a side view of a snell knot tying tool of the invention that illustrates holding the fish hook and the manner of tying the snell knot.

FIGURE 2 is a cross-sectional view taken along lines 2—2 of FIGURE 1 with the fish hook and line removed.

FIGURE 3 is a view taken along lines 3—3 of FIGURE 1 with the lines removed and the clip portion omitted.

FIGURE 4 is a view of a modified use of the invention.

FIGURE 5 is a view of still another modified use of the invention.

Referring now to FIGURE 1, a snell knot tying tool 10 has a handle 12 that may be made of plastic, wood or other suitable materials. It is preferable that the handle be made of non-corrosive material having sufficient buoyancy to float the tool, should the tool be dropped into water. The handle has projecting from one end thereof an elongated extension 14 that may be constructed of plastic, copper tubing, brass tubing or the like. The longitudinal extension 14 has longitudinal grooves 26, (see FIGURE 3), in either side that extend from the end of the extension to a point midway of the extension. The ends of grooves 26 are gradually tapered outwardly at point 34, as shown in FIGURES 1 and 3, to the cross-sectional area and shape of the portion of the extension adjacent the handle. While it should be recognized that only one groove is required to tie a snell knot, as will be more apparent hereinafter, considerable advantage emanates from using the two grooves 26, as they permit relatively untrained and effective use of the tool by persons who are either right or left handed.

A clip member 16 that may be made of plastic, brass or spring steel has a pair of ears or blade jaw members that are attached to the extension member by a band that is wrapped around the elongated extension 14. The band portion of member 16 may be an integral part of the extension 14 or attached by sweating, welding, soldering, gluing or the like. The jaw members portion of member 16 are resiliently biased together and have outwardly turned upper edges for receiving the fish hook or fishing line.

A fish hook 28 having the normal shank portion, an eye portion and a prong portion is inserted into the clip 16 and positioned for tying. When in position, the prong portion of the fish hook 28 is held between the spring jaw members portion of member 16 and is restrained from moving longitudinally, vertically or in rotation around the shank portion. The clip is capable of retaining the shank of the fish hook 28 in its position against the elongated extension 14 with sufficient positive restraining force that the fish hook will not be dislodged even when subjected to a rather strong pulling force as may be expected when a snell knot is tied using stiff leaders such as monofilament.

Referring now to FIGURE 4, the snelling tool is shown in modified use wherein a fishing line 40 is passed along groove 26 and is formed into a loop around the pair of projection knobs 22. Knobs 22 may be integral with the longitudinal extension 14 and at a normal angle. The line is pulled taut through clip 16 with the ends of the line wrapped around the extension ending up in a snell knot in a manner as will be more particularly described hereinafter. The line in passing between the ears or blades of the clip 16 may either pass between the bottom of the intersection of the blades and the longitudinal member or between the blades.

My invention also has a pair of knobs 18 and 20 (see FIGURE 5) that are integral with the longitudinal extension 14 or secured thereto in any well known manner. The projections 18 and 20 may have fishing swivels, weights or the like 46 mounted thereon that have wire connections 48 and 50. The wire end connections fit over the knobs 18 and 20 in the manner shown and are held thereon. The distance between the knobs 18 and 20 may be selectively set to handle the standard size fishing weights, swivels and the like. The line to be tied in a snell knot thereon is passed through loop 48 in the manner shown.

In operation of the use illustrated in FIGURE 1, the prong of the fish hook is inserted into the clip 16 or between the blades 36 with the eye portion 30 pointed towards the projecting end of extension member 14. The end of a line, leader or the like 30 is threaded through the eye 33 with a length of six or eight inches of line pulled through to provide sufficient tying length. The line is then held at the fish hook eye with one finger while the other hand grasps the length and wraps at least four or five turns of line around the shank of the fish hook 28 and the extension member 14. The turns are laid in successive convolutions extending toward the eye of the fish hook 28. The last spiral or convolution of line is then held in place by the end of the forefinger. The free end 31 of the line is then inserted into the groove 26 and pushed along the groove underneath the tight convolutions of line to a position as shown in FIGURE 1. The free end 31 of the line is then pulled until the loop and spirals are snugly cinched around the fish hook shank and the extension 14. The thumb and fore-finger are then placed over the spiral of line and the hook and line are slid along the elongated extension and off the end of the extension member 14. While still holding the same position with the thumb and fore-finger, the other hand grasps the line 30 above the eye 33 and pulls the spiral of line tight to the shank of the hook 28. The opposite ends of the line may then be grasped by either hand and jerked to tightly cinch the snell knot. The excess line is snipped off as desired.

In operation of the use illustrated in FIGURE 4, a line 40 is passed along groove 26 and over the side of the extension 14, through the clip 16, looped around knobs 22, returned through the clip 16, and wrapped in convolutions forming the same type of snell knot that was previously described in FIGURE 1. The loose end of the line 42 that is passed back through groove 26 and under the wrapped line is shown in phantom in FIGURE 4. After the knot is formed as shown in FIGURE 4, the line is then moved along the extension toward the handle 12 a sufficient amount to remove the loop from knobs 22. The loop line is then lifted out of the clip 16 and the line removed from the extension and tightened as previously described giving a snell knot with a loop in the end of the line.

In operation of the use illustrated in FIGURE 5, a fishing swivel, weight, or the like is secured through its wire portions 48 and 50 passing over the ends of knobs 18 and 20. In this position the swivel 46 is normally held by the frictional contact with knobs 18 and 20 at a spaced distance above the extension 14 as shown in FIGURE 5. However, it should be recognized that the weight of the swivel 46 may cause it to rest against the surface of extension 14 without interfering with the operation of my invention. A line 52 is passed along grove 26 and through the eye portion 48. This may be done before the swivel 46 is placed on knobs 18 and 20. The line is then wrapped around the longitudinal extension member as shown with the end 54 of the line being passed back through the groove 26 underneath the wrapped line. After this is accomplished, the swivel, weight or the like is removed from supporting members 18 and 20 and the snell knot tightened as previously described.

This knot, when tied as previously described and using the snell knot tying tool of this invention, provides maximum line strength at the point of the knot. Such a knot cannot slip, loosen or pull out as any pull serves to tighten the knot even more securely.

We claim:

1. A tool for tying line to a fish hook by a snell knot comprising,
    a longitudinal cylindrical member having a pair of longitudinal grooves in opposite sides of said member which grooves open radially outward,
    and said longitudinal member having holding means projecting radially outward from one of the sides of said member between said grooves for rigidly holding the hook portion of said fish hook on which said snell knot is to be tied.

2. A tool for tying line to a fish hook by a snell knot comprising,
    a handle member having a longitudinal cylindrical member,
    said cylindrical member having at least one longitudinal groove that opens radially outward and extends from the end portion of said member opposite said handle member to a point along the length of said cylindrical member,
    a ring shaped member for encircling said cylindrical member and opening on one side into a pair of radially outwardly directed spring biased members,
    and said spring members being capable of grasping the hook portion of a fish hook and holding said fish hook in a given position against the longitudinal length of said longitudinal cylindrical member.

3. A tool for tying a snell knot in fishing line comprising, a longitudinal member,
    said longitudinal member having knob means projecting outwardly thereof for receiving and holding a looped portion of fishing line,
    means positioned on said longitudinal member between said knob means and the end of said longitudinal member for converging the lines making said loop,
at least one of said lines being capable of being wrapped around said longitudinal member,
and said longitudinal member having longitudinal groove means through which the end of said wrapped line is passed between said wrapped line and said longitudinal member.

4. A tool for tying a snell knot in fishing line comprising, a longitudinal member,
said longitudinal member having knobs projecting radially outwardly thereof for receiving and holding a looped portion of fishing line,
clip means positioned on said longitudinal member between said knob and the end of said longitudinal member for receiving and holding the lines making said loop,
at least one of said lines being capable of being wrapped around said longitudinal member,
and said longitudinal member having a longitudinal groove means for passing the end of said wrapped line between said wrapped line and said longitudinal member.

5. A tool for tying a snell knot in fishing line comprising,
a handle member having an elongated extension means,
said extension having a pair of longitudinal grooves extending from the end opposite said handle to a point midway its length,
said extension means having holding means including a member encircling said extension means with blade portions projecting radially outward,
said blade portions being at times capable of receiving the hook portion of a fish hook and holding the shank of said fish hook along the longitudinal length and in alignment with said longitudinal groove,
a pair of knob means being secured to said extension means and extending radially outward in a direction normal to the longitudinal axis of said extension and to said blade portions for receiving a loop of fishing line,
said fishing line being capable of being converged between said blade portions and selectively held thereby,
and said fishing line being capable of being wrapped around said extension and over said grooves with one end of said line being passed through the eyelet of the fish hook, swivel or the like.

6. A tool for tying a snell knot in fishing line comprising,
a handle member having an elongated extension, said extension having a pair of longitudinal grooves extending from the end opposite said handle to a point midway its length,
said extension having a member encircling said extension and having resilient clip means projecting radially outward,
said clip means being capable at times of receiving said hook portion of said fish hook and holding the shank of said fish hook along said extension in alignment with said longitudinal groove,
said extension having a pair of knob means positioned in spaced relationship along the length of said extension for supporting a fishing swivel, weight, or the like to which a snell knot is to be tied,
and said fishing line being capable of being wrapped around said extension and over said grooves with one end of said line being passed through the eyelet of the fish hook or around said knobs and with the end of said line passing between said wrapped portions and said extension through said groove.

7. A tool for tying a snell knot in a fishing line comprising,
a longitudinal member having at least one longitudinal groove in the surface of said member which groove opens radially outward,
said longitudinal member having holding means projecting radially outward from the surface of said member and away from said groove for rigidly holding the hook portion of a fish hook, which fish hook has a shank portion,
and said longitudinal groove extending from one end of said longitudinal member to a point along the length of said longitudinal member that is adjacent the normally positioned shank portion of the fish hook held by said holding means.

8. A tool for tying a snell knot in a fishing line as claimed in claim 7 in which,
the end of said longitudinal groove at said point along the length of said longitudinal member being flared radially outward to the outer surface of said member.

9. A tool for tying a snell knot in a fishing line as claimed in claim 7 in which,
said holding means holding said fish hook and said shank portion substantially against the outer surface of said member thereby allowing a fishing line to be wrapped around said shank portion and said member simultaneously.

10. A tool for tying a snell knot in a fishing line as claimed in claim 7 in which,
said longitudinal member having a substantially uniform cross-sectional dimension throughout the length of said longitudinal groove.

11. A tool for tying a snell knot in fishing line comprising,
a longitudinal member,
said longitudinal member having knobs secured in spaced relationship along the length of said member for supporting a fishing swivel, weight or the like, which fishing swivel, weight or the like has eyelets for receiving a loop of fishing line that is capable of being wrapped around said longitudinal member,
and said longitudinal member having a longitudinal groove for passing one end of the fishing line between the wrapped portion of the line and said longitudinal member.

References Cited

UNITED STATES PATENTS 3,106,417  10/1963  Clow _____ 289—17
3,177,021  4/1965  Benham _____ 289—17

MERVIN STEIN, *Primary Examiner.*

LOUIS K. RIMRODT, *Assistant Examiner.*